July 14, 1970 L. E. R. ROGIER 3,520,386
DISC-BRAKE, ESPECIALLY FOR INDUSTRIAL USE
Filed Dec. 18, 1967 4 Sheets-Sheet 1
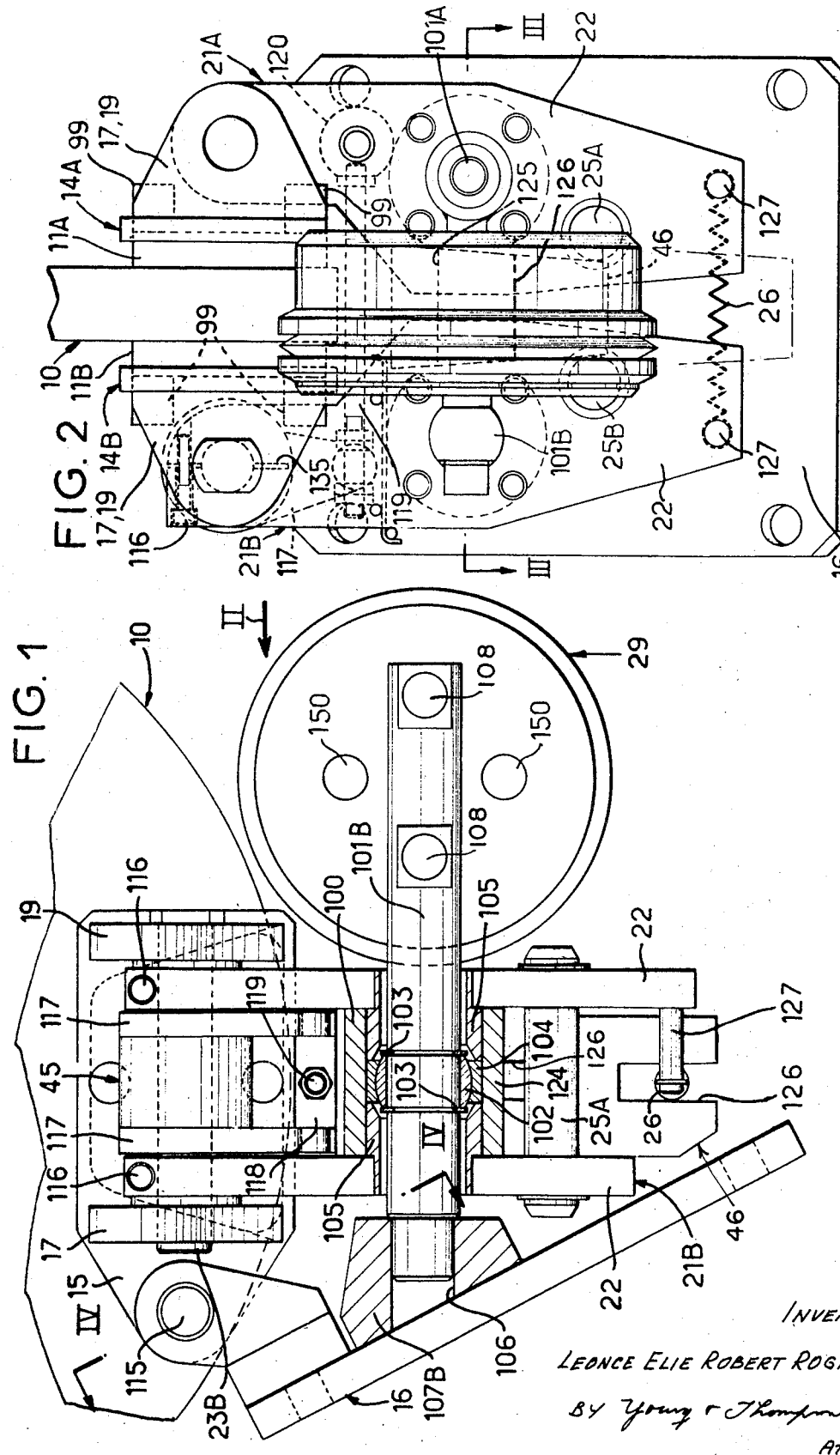
INVENTOR
LEONCE ELIE ROBERT ROGIER
BY Young & Thompson
ATTYS.

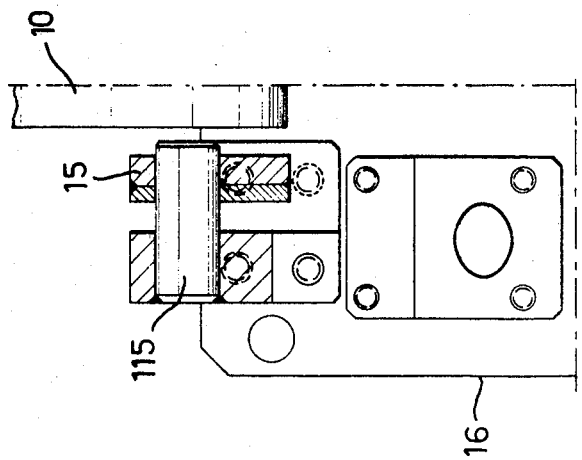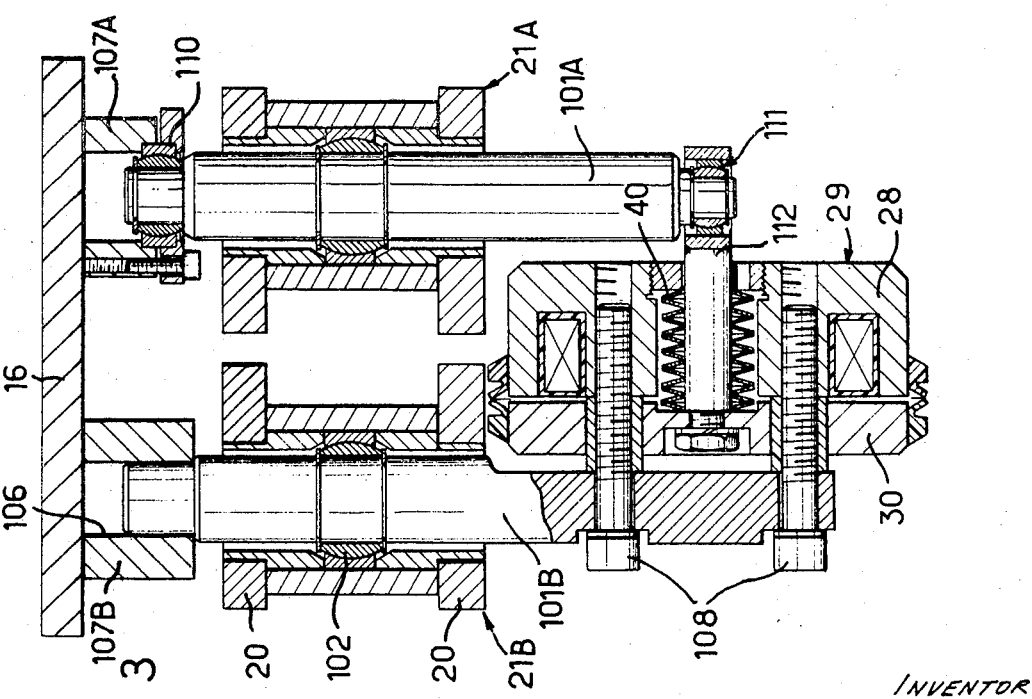

July 14, 1970  L. E. R. ROGIER  3,520,386
DISC-BRAKE, ESPECIALLY FOR INDUSTRIAL USE
Filed Dec. 18, 1967  4 Sheets-Sheet 3
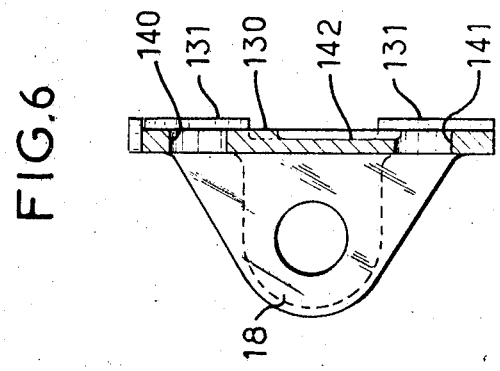
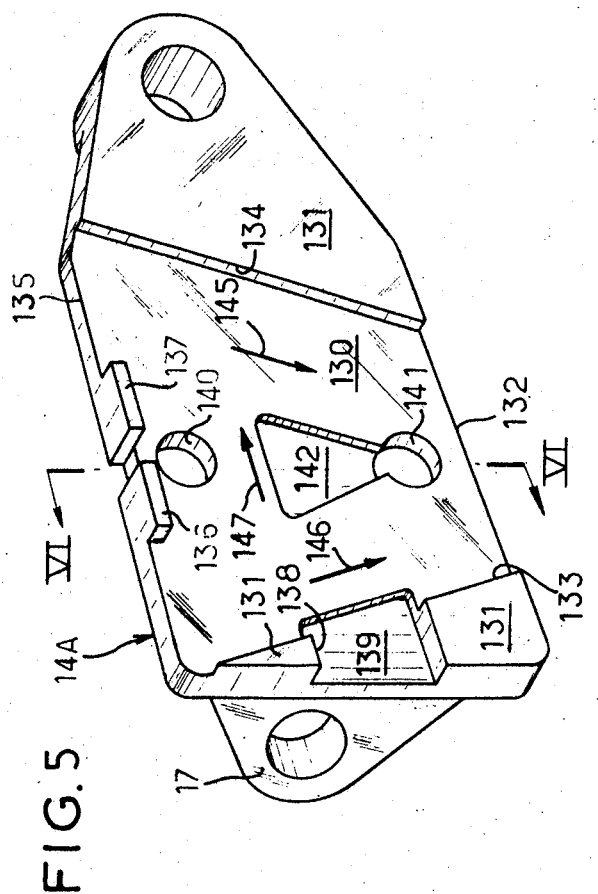
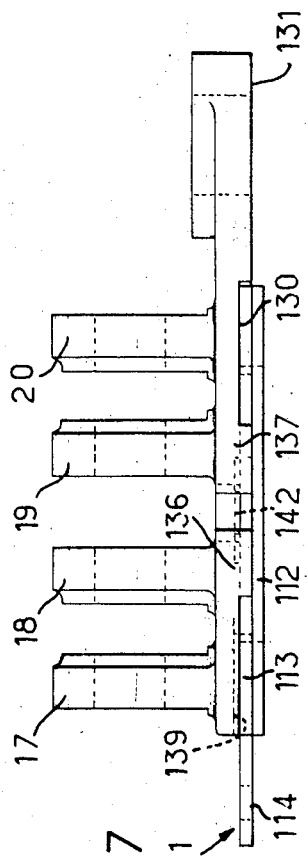
INVENTOR
LEONCE ELIE ROBERT ROGIER
BY Young + Thompson
ATTYS.

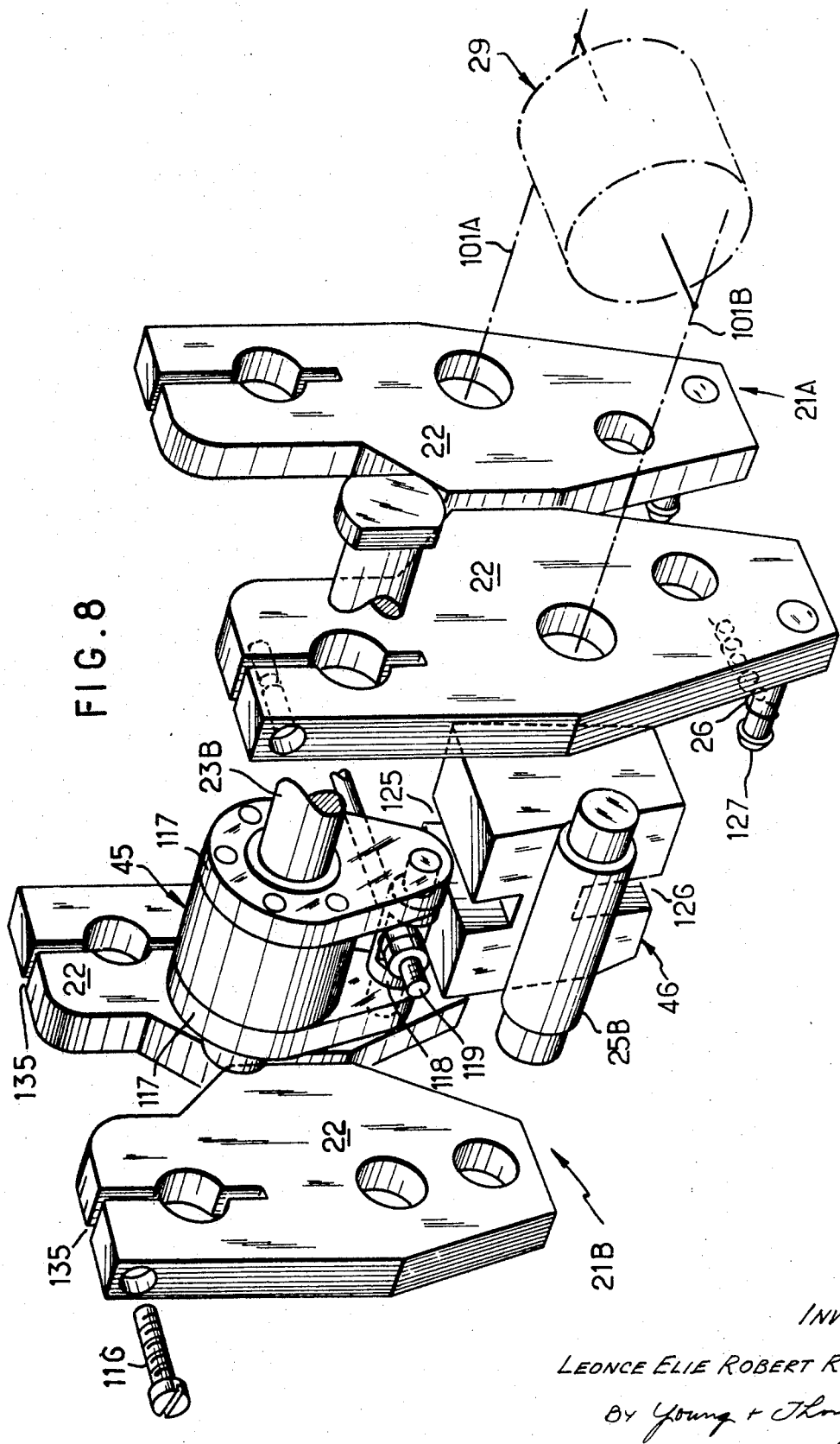

United States Patent Office 3,520,386
Patented July 14, 1970

1

3,520,386
DISC-BRAKE, ESPECIALLY FOR INDUSTRIAL USE
Léonce Elie Robert Rogier, Saint-Denis, France, assignor to Societe Anonyme Francaise du Ferodo, Paris, France, a corporation of France
Filed Dec. 18, 1967, Ser. No. 691,407
Claims priority, application France, Dec. 29, 1966, 89,272
Int. Cl. B60t *13/04*
U.S. Cl. 188—171                        7 Claims

ABSTRACT OF THE DISCLOSURE

The linings of the brake according to the invention are articulated on the actuating levers and the operating electro-magnet of the brake acts on these levers through the intermediary of pillars, of which at least one is articulated on the frame. This electro-magnet is arranged between the said pillars so that the surface area at the ground of the electro-magnet is wholly contained within that of the levers. The general overall size of the brake is thereby advantageously reduced to a substantial extent.

---

Disc-brakes are already known, especially for industrial use, comprising a frame, a rotating disc fixed to the shaft to be braked, two brake linings carried by shoes on each side of the said disc, pivotally-mounted brake levers on the said shoes, and means for automatically taking-up wear of the brake linings.

The present invention has for its object improvements having the purpose of reducing the overall size and in particular the dimensions on the ground of this disc brake.

According to one of these improvements, the operating means act on the shoe levers through the intermediary of pillars coupled to the said levers at their central portion, to the frame at one of their extremities and to the said operating means at the other of their extremities, the said operating means being arranged between the said pillars.

By virtue of this arrangement, the surface area at the ground of the operating means is wholly contained within that of the shoe levers.

In accordance with another improvement of the invention, the means for automatically taking-up the wear of the brake linings comprise a uni-directional coupling means, such as a free-wheel, ratchet-wheel or the like, the said uni-directional coupling means being disposed around the pivot provided between any one of the shoe levers and the associated brake-shoe.

By virtue of this arrangement, the volume between the shoe levers is advantageously free, and it is then permissible to spread in this space the fixing means provided at those extremities of the shoe levers which are opposite to the brake-shoes.

In accordance with another improvement of the invention, the said fixing or wedging means comprise a block, this block being provided with a slot and the associated elastic retaining means, stretched between the two brake levers, pass into the said slot.

These last two arangements, which ensure a better utilization of the space comprised between the brake-levers, contribute to the production of a brake, in which the overall space occupied is, all other things being equal, substantially reduced.

The characteristic features and advantages of the invention will further be brought out in the description which follows below, reference being made to the accompanying drawings, in which:

FIG. 1 is a view in elevation with local cross-section, of a disc-brake according to the invention;

2

FIG. 2 is a side view of this brake, looking in the direction of the arrow II of FIG. 1;

FIG. 3 is a view in cross-section of this brake taken along the line III—III of FIG. 2;

FIG. 4 is a view in partial cross-section taken along the line IV—IV of FIG. 1;

FIG. 5 is a perspective view of a particular form of construction of a brake-shoe utilized in the brake according to the invention;

FIG. 6 is a view in cross-section of this shoe, taken along the line VI—VI of FIG. 5;

FIG. 7 is a view from above of an assembly formed by this shoe and the associated brake-lining; and FIG. 8 is an exploded fragmentary perspective view of a brake according to the invention.

In these drawings, the disc to be braked can be recognized at 10. On each side of this disc are arranged two brake-linings 11A, 11B, respectively fixed on brake-shoes 14A, 14B. The latter are each provided with longitudinal lug 15 which permits their articulation with play on a pivot 115 rigidly fixed to a sole plate 16 of a support, and two transverse lugs 17, 19, providing an articulation for a brake-lever, 21A and 21B respectively, arranged obliquely with respect to the supporting sole-plate 16. Each brake-lever is formed by two parallel end-plates 22, coupled to each other at one of their extremities by a pivotal stud, 23A, 23B respectively, engaged in the lugs 17 and 19 of the associated shoe, in their central zone by a sleeve 100 fixed by screwing (not shown), and at the other extremity by a supporting stud 25A, 25B respectively.

In the sleeve 100 of each of the brake-actuating levers 21A and 21B is engaged a pillar 101A, 101B respectively, the axis of which is substantially perpendicular to the constitutent end-plates 22 of these actuating levers. Between each pillar 101A, 101B and the associated sleeve 100 is interposed a swivel joint formed in known manner by a convex toric ring 102 engaged on the corresponding pillar 101A, 101B and held in position on this latter by circlips 103, the said convex ring 102 co-operating with a concave toric ring 104 engaged in the sleeve 100 and held in position by small sleeves 105 supported against the end-plates 22 of the corresponding actuating lever.

At one of its extremities, the pillar 101B associated with the brake-lever 21B is engaged in the bore 106 of a boss 107B fixed, for example by screwing, on the supporting sole-plate 16. At its other extremity, this pillar 101B is coupled by bolts 108 to the yoke 28 of a control electro-magnet 29.

At one of its extremities, the pillar 101A associated with the actuating lever 21A is articulated by a swivel-joint 110 of the same type as that described above, to a boss 107A fixed as previously on the sole-plate 16. At its other extremity, this pillar 101A is articulated by a similar swivel-joint 111 to a tie-rod 112 fixed to the armature 30 of the electro-magnet 29.

The electro-magnet 29 is arranged between the pillars 101A, 101B, and it will be observed that in this way its surface area at the ground is wholly comprised inside that of the actuating levers 21A, 21B. A stack of elastic washers 40 of the Belleville type tends to hold the armature 30 away from the yoke 28.

According to the present invention, a free-wheel 45 associated with the actuating lever 21A, 21B is arranged round the pivotal stud 23B provided between the actuating lever 21B and the associated shoe 14B. The inner cage of this free-wheel (not shown in the drawings), is fixed for rotation on this stud 23B, and this is also the case for the end-plates 22 of the lever 21B. In order to provide for this, the corresponding extremities of these end-plates are provided with a slot 135, so as to form two jaws gripped on the pivotal stud 23B by the bolts 116.

The outer cage of the free-wheel 45 is rigidly fixed to two arms 117 connected together by a sleeve 118. This sleeve 118 is connected by a tie-rod 119 to a cross-member 120 connecting together the end-plates 22 of the actuating lever 21A.

According to the invention, the space thus liberated by the free-wheel 45 between the actuating levers 21A and 21B, is made available for the accommodation of a trapezoidal block 46 which is carried on the supporting studs 25A, 25B, associated respectively with the brake-actuating levers 21A and 21B. In FIG. 1, the block 46 is shown in a position near its lowermost position. In FIG. 2, the block 46 is shown in dotted line in a position near its uppermost position; while its lowermost position is indicated in chain dotted line.

To this end, the trapezoidal block 46 is provided at its corresponding extremity with a slot 125 intended to permit the passage of the tie-rod 119 when the said block is in its top position.

At its other extremity, this block is also provided with a slot 126 which is intended, when the block is in its bottom position, to permit the passage of the retaining spring 26 which, according to the invention, is arranged in the space between the actuating levers 21A, 21B, and which is tensioned between studs 127 rigidly fixed to either of the end-plates of the brake-linings.

In addition, bolts 150, of which only the head is visible in FIG. 1, are slidably engaged in the armature 30 of the electro-magnet 29 and are screwed into the yoke 28 of this electro-magnet in order to permit a mechanical clamping of the stack 40 if necessary.

The operation of this brake is as follows: when the electro-magnet 29 is not excited, the action of the stack 40 of Belleville washers pushes back the armature of the magnet and in consequence brings the pillar 101A closer to the pillar 101B. The actuating levers 21A, 21B, which are articulated on the associated pillars and which are supported on the studs 25A, 25B, the distance apart of which is controlled by the block 46, thus actuate the braking operation of the brake-linings 11A, 11B.

If the electro-magnet 29 is energized in order to release the disc 10, the withdrawal of the armature 30 against the force of the stack 40 is effected in two stages.

In a first stage, which corresponds either to the absorption of the assembly play inevitably present in a free-wheel or to the absorption of a play provided for that purpose between the various parts present, there is a release of the disc by reducing the initial air-gap to zero, no account being taken of the additional air-gap resulting from the wear of the brake-linings.

Then, in a second stage, the armature continues its movement of withdrawal and, after absorption of this additional air-gap, comes into contact with the yoke of the electro-magnet. In this movement, the levers 21A and 21B, respectively fixed to the inner cage and the outer cage of the free-wheel, which cannot have any retrograde movement with respect to each other, pivot about their respective studs 23A and 23B and liberate the block 46 which slides, due to its own weight, on the lower end-plates 22 of the actuating levers 21A and 21B in order to keep in contact with the corresponding supporting studs 25A, 25B. For this reason, the supporting base on which the next braking action will be effected is widened, this widening thus corresponding automatically to the wear of the linings recorded during the course of the previous braking operation.

As will have been observed, the yoke 28 of the electro-magnet is stationary, since it is fixed by the pillar 101B which is rigidly coupled to the sole-plate 16. The pillar 101B associated with the actuating lever 21B pivots slightly on the other hand, by virtue of its swivel-joints 102, 110, and 111, which permits it to take an appropriate inclination with regard to the actuating lever 21A, the sole-plate 116 and the tie-rod 112 respectively, which couple it to the armature 30 of the electro-magnet 29.

Although this is not essential, the swivel-joint 102 of the pillar 101B associated with the actuating lever 21B permits this actuating lever to pivot slightly with respect to this pillar 101B, especially for the purpose of following better the various driving or oscillating movements to which the brake-shoe 14B is subjected during operation.

There will now be described with reference to FIGS. 5 to 7 one particular form of construction of a brake-shoe and its associated brake-lining. According to this form of construction, the shoe 14A for example is provided with four transverse lugs 17, 18, 19, 20 for its articulation on the associated actuating lever 21A. This brake-shoe 14A has a trapezoidal housing 130 formed, as will be described below, recessed with respect to a plane 131 straight from casting. This housing 130 is open along its small base 132, is bordered laterally by oblique flanks 133, 134, and comprises along its large base 135, open like the small base 132, two studs 136, 137. The flank 133 is traversed in its central portion by a groove 138 formed directly above a recessed portion 139, straight from casting, and recessed with respect to the bottom of the housing 130. The shoe is further provided with two transverse holes 140, 141 for the passage of magnetic studs intended to ensure the holding of the brake-lining, and a central triangular recess 142, the function of which will be described later.

The housing 130 can readily be produced by milling; a first cut is taken following an oblique direction shown diagrammatically by the arrow 145 in FIG. 5, a second oblique cut parallel to the arrow 146, and longitudinally a third cut shown diagrammatically by the arrow 147, this last cut being made possible by the first two. The cuts 145 and 146 are effected in such manner as to leave the projections 136, 137. As will have been understood, these cuts would leave an island between them, and it is for that reason that a recess 142 is initially provided to take the place of this island.

This form of construction is simple and permits of rapid and easy mounting of the brake-lining 11A. This latter has a fixing extension 114 intended to be placed in the cut 138 and is formed by a base-plate 113 on which is fixed, for example by sticking, a lining 112 (FIG. 7).

The brake-lining plate 11A has a trapezoidal form complemenetary to that of the housing 130 and is held in this housing by magnetic studs 99 (see FIG. 2).

It will of course be understood that the present invention is not limited to the form of embodiment shown, but includes any alternative form of construction.

What I claim is:

1. A disc brake, especially for industrial use, comprising a frame, a rotating disc fast with the shaft to be braked, brake shoes on each side of said disc, brake lining on each of the brake shoes, brake-actuating levers pivotally mounted on said brake shoes, two pillars each substantially parallel to the said disc, each of said pillars being coupled, at its central portion, to one of said levers at a point thereon spaced from the pivot mounting of the lever on the corresponding brake shoe and at one of its extremities to said frame, and operating means acting on each of said pillars at the other extremities thereof.

2. A disc-brake as claimed in claim 1, in which the couplings of one of said pillars to the frame, to the associated actuating lever and to said operating means each comprise a swivel-joint.

3. A disc-brake as claimed in claim 2, in which the coupling of the other said pillar to the associated actuating lever comprises a swivel-joint.

4. A disc-brake as claimed in claim 1, and means for automatically taking-up wear of the brake-lining comprising a uni-directional coupling means such as a free-wheel, said means being disposed round the pivot provided between any one of the said actuating levers and the associated brake shoe.

5. A disc-brake as claimed in claim 1, in which said operating means comprise an electro-magnet, the armature of said magnet being coupled to one of said pillars, while the yoke of said magnet is coupled to the other said pillar.

6. A disc-brake as claimed in claim 1, and further comprising wedging means including a block sliding under its own weight on a base, said block being split at one of its extremities to form a slot, and elastic retaining means associated with said block and tensioned between the two brake-actuating levers, said elastic means passing into said slot.

7. A disc-brake as claimed in claim 1, in which each brake-shoe is provided, for the reception of a brake-lining, with a trapezoidal housing open along its small base and along its large base, and having at least one projecting boss along said large base.

References Cited

UNITED STATES PATENTS

| | | | |
|---|---|---|---|
| 2,627,322 | 2/1953 | Tack | 188—59 |
| 2,707,532 | 5/1955 | Ricci | 188—59 |
| 2,979,164 | 4/1961 | Altherr | 188—59 |
| 3,171,515 | 3/1965 | Wolfe | 188—171 |
| 3,237,730 | 3/1966 | Edwards | 188—72 X |

DUANE A. REGER, Primary Examiner

U.S. Cl. X.R.

188—73, 196, 206